(12) United States Patent
Larsen

(10) Patent No.: US 8,707,614 B2
(45) Date of Patent: Apr. 29, 2014

(54) ILLUMINATED INSECT CATCHING DEVICE

(71) Applicant: Lance Larsen, Breton (CA)

(72) Inventor: Lance Larsen, Breton (CA)

(*) Notice: Subject to any disclaimer, the term of this patent is extended or adjusted under 35 U.S.C. 154(b) by 0 days.

(21) Appl. No.: 14/030,097

(22) Filed: Sep. 18, 2013

(65) Prior Publication Data

US 2014/0013650 A1    Jan. 16, 2014

Related U.S. Application Data

(60) Continuation of application No. 13/657,629, filed on Oct. 22, 2012, which is a division of application No. 12/572,485, filed on Oct. 2, 2009, now Pat. No. 8,291,638.

(51) Int. Cl.
*A01M 1/08* (2006.01)

(52) U.S. Cl.
USPC ........................................... 43/113

(58) Field of Classification Search
USPC ........................................ 43/113, 114, 136
See application file for complete search history.

(56) References Cited

U.S. PATENT DOCUMENTS

| | | | | |
|---|---|---|---|---|
| 1,461,169 A * | 7/1923 | Wilson | | 43/113 |
| 4,212,129 A * | 7/1980 | Shumate | | 43/113 |
| 4,654,998 A * | 4/1987 | Clay | | 43/113 |
| 5,044,112 A * | 9/1991 | Williams | | 43/113 |
| 5,142,815 A | 9/1992 | Birdsong | | |
| RE34,402 E | 10/1993 | Williams | | |
| 5,556,192 A | 9/1996 | Wang | | |
| 6,155,002 A * | 12/2000 | Holder | | 43/115 |
| 6,478,440 B1 | 11/2002 | Jaworski et al. | | |
| 6,560,919 B2 | 5/2003 | Burrows et al. | | |
| 6,655,078 B2 | 12/2003 | Winner et al. | | |
| 6,886,292 B2 | 5/2005 | Studer et al. | | |
| 6,920,716 B2 | 7/2005 | Kollars, Jr. et al. | | |
| 7,036,268 B2 | 5/2006 | Taylor et al. | | |
| 7,191,560 B2 * | 3/2007 | Harris | | 43/114 |
| 2002/0078620 A1 * | 6/2002 | Nelson et al. | | 43/113 |
| 2003/0079398 A1 * | 5/2003 | Holmes | | 43/113 |
| 2006/0107583 A1 * | 5/2006 | Wu | | 43/113 |
| 2006/0150472 A1 * | 7/2006 | Harris | | 43/113 |
| 2010/0263260 A1 * | 10/2010 | Engelbrecht et al. | | 43/113 |
| 2012/0174470 A1 * | 7/2012 | Studer et al. | | 43/113 |

* cited by examiner

*Primary Examiner* — Christopher P Ellis
(74) *Attorney, Agent, or Firm* — Dwayne E. Rogge; Schacht Law Office, Inc.

(57) ABSTRACT

This disclosure relates to the field of illuminated insect-catching devices. In particular to insect-catching devices comprising an adhesive surface upon which insects are trapped. In particular the illuminating component is electrically powered.

7 Claims, 3 Drawing Sheets

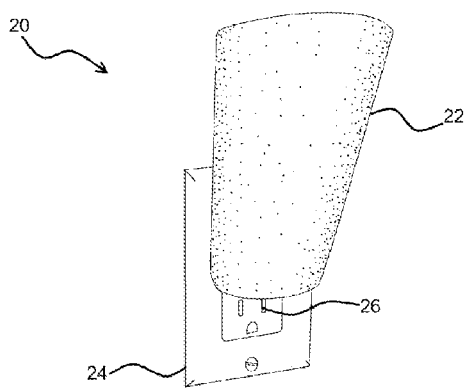
FIG. 1
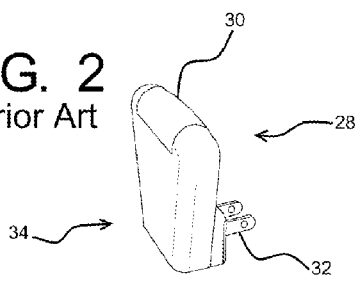
FIG. 2
Prior Art
FIG. 3
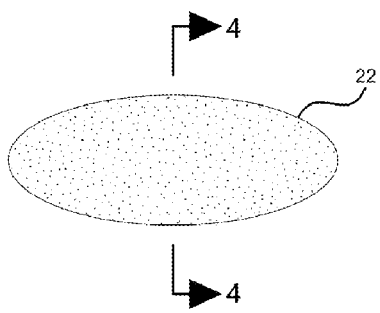
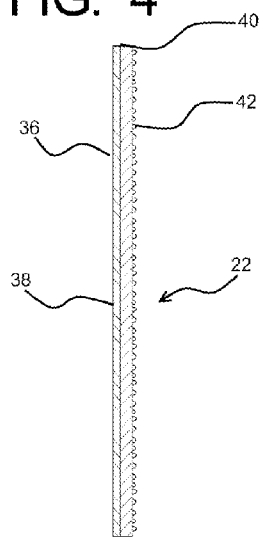
FIG. 4
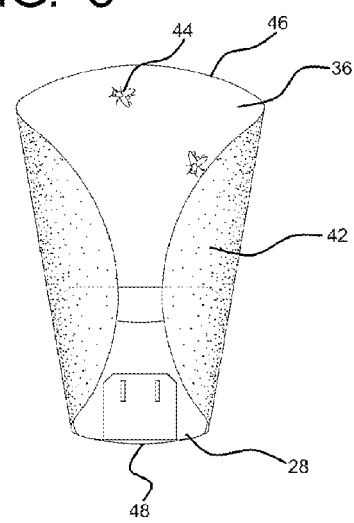
FIG. 5

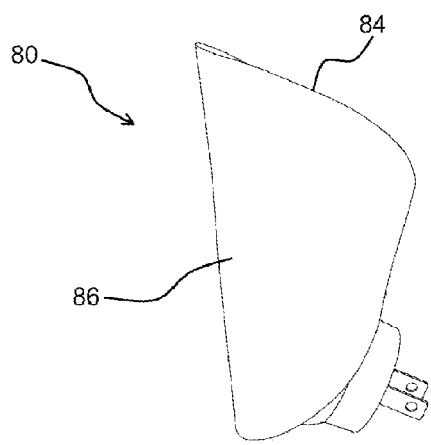
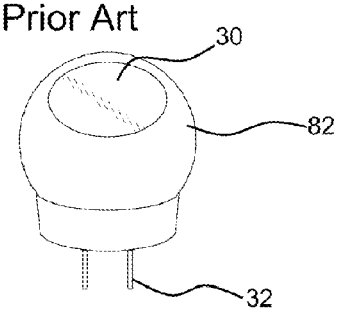
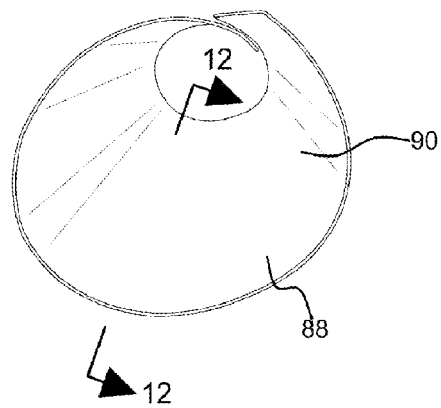
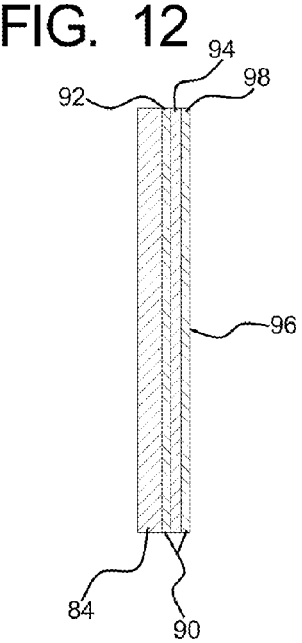

ILLUMINATED INSECT CATCHING DEVICE

RELATED APPLICATIONS

This application is a continuation of U.S. Ser. No. 13,657,629, filed on Oct. 2, 2009, a divisional of U.S. Pat. No. 8,291,638 issued on Oct. 23, 2012, incorporated herein by reference.

BACKGROUND OF THE DISCLOSURE

Field of the Disclosure

This disclosure relates to the field of illuminated insect-catching devices, in particular to insect-catching devices comprising an adhesive surface. In particular, an illuminating portion is electrically powered, in one form by standard household power.

SUMMARY OF THE DISCLOSURE

An insect-catching device as shown in FIGS. 1-5 to be attached to an illuminating night light which has a light emitting portion and an electric plug portion. The insect-catching device in one example comprising: a self-supporting flexible structure; a decorative side; and an adhesive side comprising an adhesive substance. In one example, the adhesive substance attaches the insect-catching device to the night light; and the adhesive side extends beyond the night light such that insects may be captured upon the adhesive substance.

The insect-catching device may also be configured wherein the self-supporting flexible structure is substantially an ellipse when laid flat. The adhesive insect-catching device in another embodiment is arranged such that the self-supporting flexible structure is substantially a circle. In one example, the self-supporting flexible structure has a diameter of 4-8 inches in diameter when laid flat.

The insect-catching device may be arranged wherein the night light portion further comprises a male plug portion operatively configured to electrically couple to a household power supply.

Another example of an adhesive insect-catching device is shown in FIGS. 6-8 is disclosed comprising: a light emitting portion; a rigid outer portion coupled to the light emitting portion and extending therefrom; wherein the rigid outer portion comprises an inner surface and an outer surface; a removable inner portion having an outer surface which substantially conforms to the inner surface of the rigid outer portion, and an inner surface; an adhesive layer disposed on the inner surface of the inner portion, the adhesive layer operatively configured to trap insects. The adhesive insect-catching device may also be arranged such that the light emitting portion is coupled to a scent emitting portion operatively configured to emit a scent pleasing to humans.

The insect-catching device may also be arranged wherein the adhesive layer is removably disposed on the inner surface of the inner portion. In this way, the adhesive with insects attached can be removed and discarded (recycled) to reduce waste and cost.

The insect-catching device may be arranged wherein the inner portion is not coupled to, but simply rests upon the inner surface of the outer portion. As each portion in one form is a frustoconical shape, the larger upper surface may open upwards, such that gravity holds the inner portion within the outer portion. In other orientations, adhesives, or other attachment structures and materials could be utilized to hold the inner portion within the outer portion.

The insect-catching device may also attach to an illuminating component comprise a male plug portion operatively configured to electrically couple to a household power supply. In the US, this is normally 110 volt AC with well known two (or three) prong plugs and receivers.

BRIEF DESCRIPTION OF THE DRAWINGS

FIG. 1 is an isometric view of an insect-catching device in one form attached to a standard household outlet.

FIG. 2 is a prior art night light in one form.

FIG. 3 is a plan view of the adhesive portion of a insect-catching device in one form.

FIG. 4 is a cutaway view taken along the line 4-4 of FIG. 3.

FIG. 5 is a rear view of an insect-catching device in one form.

FIG. 9 is an isometric view of another example of an insect-catching device in one form.

FIG. 10 is a prior art night light in one form.

FIG. 11 is a top view of the insect-catching device shown in FIG. 9 with the night light removed.

FIG. 12 is a cutaway view taken along line 12-12 of FIG. 11.

DESCRIPTION OF THE PREFERRED EMBODIMENTS

Figure 6:
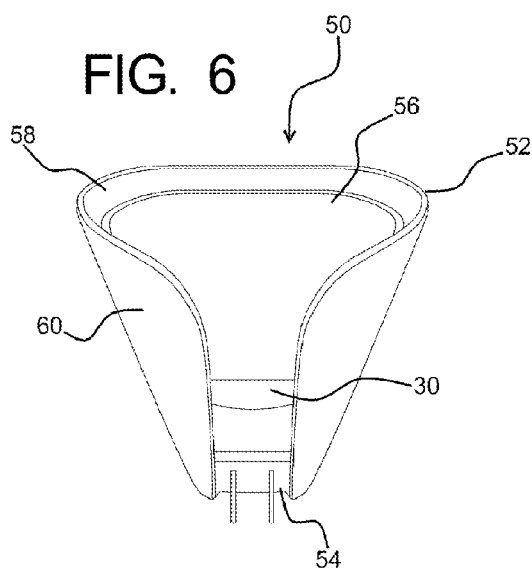
FIG. 6 is another example of an insect-catching device in one form.

Described herein is a simple and novel apparatus for reducing the number of insects in one's home. The apparatus generally comprises a light-emitting portion similar to a prior art night light and an adhesive portion for trapping the insects. While the term "insects" is used, it would be obvious that this device would also catch other small animals such as arachnids, worms, etc. The term insects will be used in this disclosure to include all such creatures.

Looking to FIG. 1 is an insect-catching device 20 in one form. This view generally shows the outer side of an adhesive portion 22 and a standard electric outlet 24, comprising a plurality of female electric receptacles 26. Looking to FIG. 2, one embodiment of a prior art night light 28 is shown, comprising a light-emitting portion 30 and a plurality of male electric plugs 32, which engage the female electric receptacles 26 of FIG. 1. The night light 28 of FIG. 2 may also comprise a scent emitter 34, which could be configured to emit a scent that is pleasing to humans. Such night-light and scent emitter combinations are well known in the art, such as is found in U.S. Pat. No. 6,478,440, incorporated herein by reference.

FIG. 3 shows one example of the adhesive portion 22 laid flat to show the simplicity of the design. While it is shown as an elongated ellipse, it also could have other forms, including a circle, a special form of an ellipse.

FIG. 4 is a cross section of the embodiments shown in FIGS. 1 and 3, taken along line 4-4 of FIG. 3. As shown, the adhesive portion 22, in one form, comprises an adhesive surface 36, which has an adhesive substance 38 disposed thereon. The adhesive surface 36 is also attached to a flexible structure 40 in one form to add rigidity to the device. In one form, the outer surface 42 of the adhesive portion 22 is decorative, either by texture, color, or a combination thereof.

Looking to FIG. 5, it can be seen how the adhesive surface 36 is adhered to the surface of the night light 28, such that the adhesive surface 36 would capture any insects 44 coming into contact with the adhesive surface 36. The surface 42 would be most visible to users, as the outlet 24 shown in FIG. 1 is generally attached to a planar wall, and thus at least a portion of the adhesive surface 36 would face said wall. In one form, the insect-catching device 20 is opaque, such that users would normally not view any insects 44 which may become entrapped by the adhesive surface 36. To ease in manufacture, the adhesive surface 36 may be continuous from the upper edge 46 to the lower edge 48 such that the adhesive which attaches the adhesive portion 22 to the outer surface of the night light 28 would be substantially the same as the adhesive which entraps the insects 44. This configuration would allow the adhesive portion 32 to attach to a multitude of different night-lights 28 of varying configurations.

Figure 7:
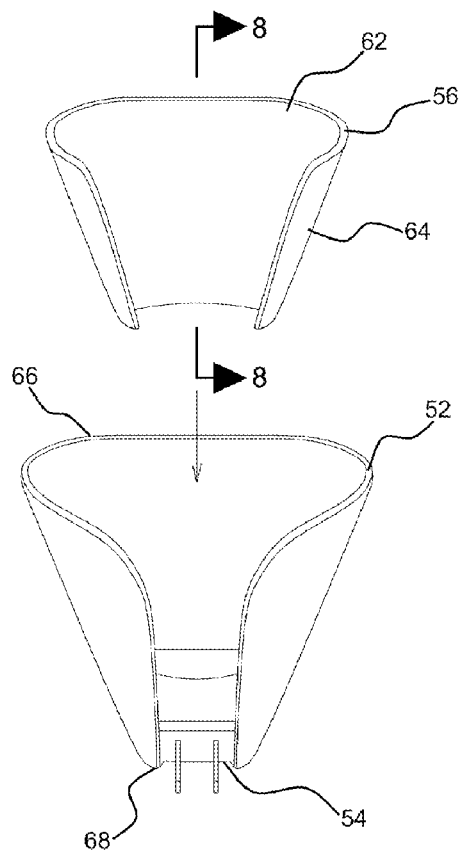
FIG. 7 is a rear view of an insect-catching device in one form.

Looking to FIG. 6, another embodiment of the insect-catching device 50 is shown, which generally comprises a rigid outer portion 52, which is coupled to the night light portion 54 and a removable inner portion 56, which is operably configured to entrap the insects, and may be removed from the rigid outer portion 52 and in some cases discarded or recycled. The rigid outer portion 52 in one example generally comprises an inner surface 58 and an outer surface 60. The removable inner portion 56, as shown in FIG. 7, also comprises an inner surface 62 and an outer surface 64. In one form, the outer surface 64 is configured to the inner surface 58 of the rigid outer portion 52. When one example of the insect-catching device 50 is oriented such that the upper edge 66 of the rigid outer portion 52 is vertically above the lower edge 68, gravity may be sufficient to keep the removable inner portion 56 within the inner surface 58 of the rigid outer portion 52. Removable adhesives, hook and loop, and other adhesive or restraining structures and materials could be utilized.

Figure 8:
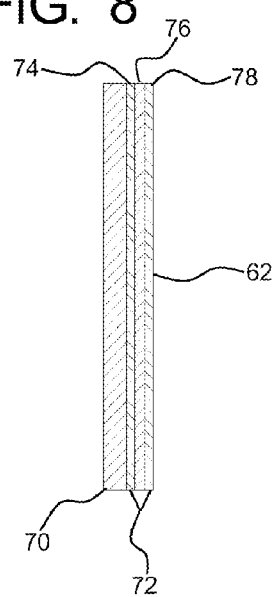
FIG. 8 is a cutaway view taken along line 8-8 of FIG. 7.

Looking to FIG. 8, which is a cross sectional view of one example of the removable inner portion 56 taken along line 8-8 of FIG. 7, in this drawing the different layers are easily perceived. In one form, the removable inner portion 56 comprises a rigid inner structure 70 and adhesive layers 72. One of which forms the inner surface 62 of the removable inner portion 56. In one form, the adhesive layer 72 may comprise multiple sub-layers, such as an adhesive sub-layer 74, configured to couple a carrier sub-layer 76 to the rigid inner structure 70. In this example, a second adhesive sub-layer 78 may be disposed on the carrier sub-layer 76 to entrap insects, which would encounter the adhesive sub-layer 78.

In the embodiment shown, to replace the adhesive layer, the removable inner portion 56 could either be removed from the rigid outer portion 52 and discarded or the adhesive layer 72 could be removed from the rigid inner structure 70 wherein the adhesive layer 72 would be discarded and replaced with a new layer.

The embodiment shown in FIG. 9 is an insect-catching device 80 coupled to a prior art night light 82, such as the example shown in FIG. 10. The insect-catching device 80 generally incorporates several of the novel concepts of the prior two embodiments. In this embodiment, a rigid structure 84 is attached to the night light 82 and generally comprises an outer surface 86 and an inner surface 88, shown in FIG. 11. In one form, the rigid structure 84 is moldable to allow the structure 84 to be fitted to a night light 82 of various configurations. An adhesive layer 90 is disposed on the inner surface 88, and in one form, the adhesive layer 90 as shown in FIG. 12 comprises an adhesive 92 which couples a carrier layer 94 to the rigid structure 84. The inward surface 96 of the adhesive layer 90 comprises an adhesive 98, as previously disclosed, and generally is configured to entrap insects that encounter said adhesive 98.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An insect-catching device to be attached to a light emitting device comprising a night light, the insect-catching device comprising:
    a. a flexible structure;
    b. an adhesive side comprising an adhesive substance;
    c. wherein the adhesive substance removably attaches the insect-catching device to the night light;
    d. wherein the adhesive substance faces toward the light emitting portion of the night light; and
    e. the adhesive side extends vertically above the night light such that insects may be captured upon the portion of the adhesive substance not in contact with the night light.

2. The insect-catching device as recited in claim 1 wherein the flexible structure is substantially an ellipse when laid flat.

3. The insect-catching device as recited in claim 2 wherein the flexible structure is substantially a circle when laid flat.

4. The insect-catching device as recited in claim 1 wherein the flexible structure is decorative in color or texture on the side opposing the adhesive side.

5. The insect-catching device as recited in claim 1 wherein the flexible structure is self-supporting.

6. The insect-catching device as recited in claim 1 wherein the flexible structure is supported by and removably attached to a support structure.

7. The insect-catching device as recited in claim 1 is self-supporting and moldable to the shape of an external surface of the light emitting device.

\* \* \* \* \*